June 9, 1959 T. B. KEESLING 2,889,911
FEED MECHANISM
Filed June 13, 1955 6 Sheets-Sheet 1

INVENTOR
THOMAS B. KEESLING
BY Moore, Prangley & Clayton
ATTORNEYS

INVENTOR
THOMAS B. KEESLING
BY Moore, Prangley & Clayton
ATTORNEYS

June 9, 1959

T. B. KEESLING 2,889,911

FEED MECHANISM

Filed June 13, 1955

INVENTOR
THOMAS B. KEESLING
BY Moore, Prangley + Clayton
ATTORNEYS

June 9, 1959

T. B. KEESLING 2,889,911

FEED MECHANISM

Filed June 13, 1955

INVENTOR
THOMAS B. KEESLING
BY Moore, Prangley & Clayton
ATTORNEYS

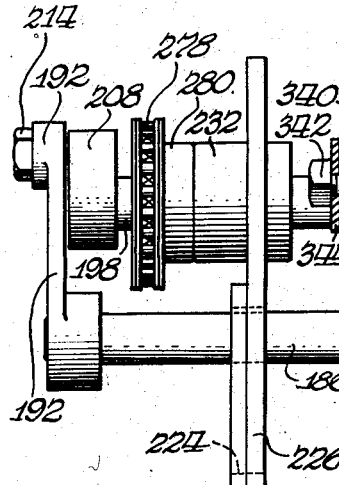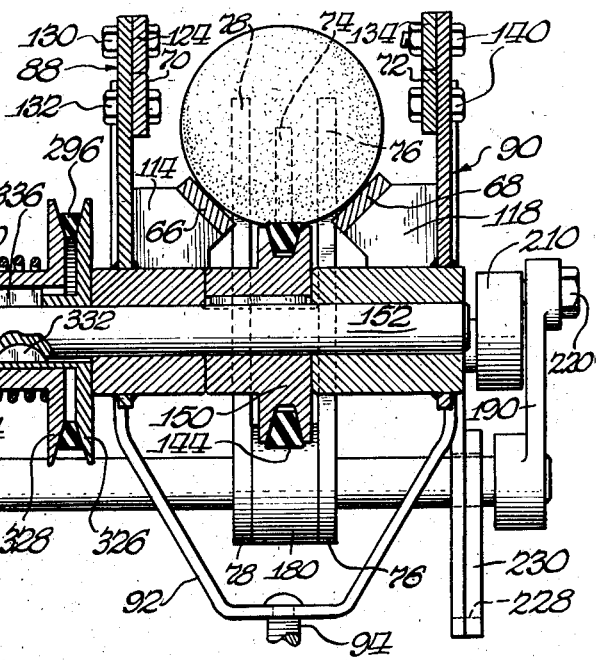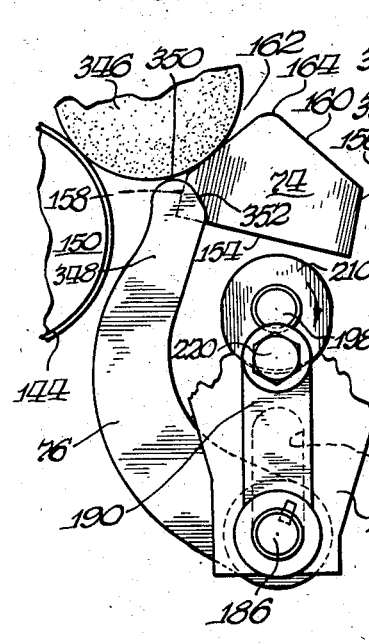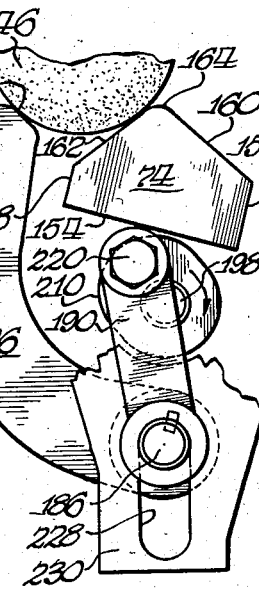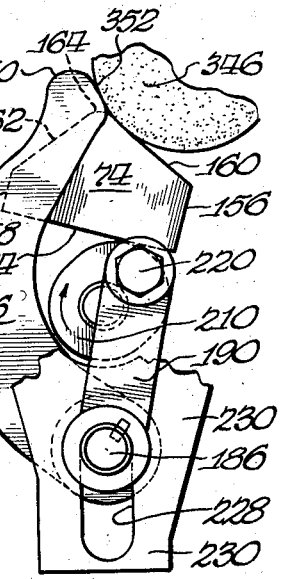
INVENTOR
THOMAS B. KEESLING
BY Moore, Prangley + Clayton
ATTORNEYS June 9, 1959
T. B. KEESLING
2,889,911
FEED MECHANISM
Filed June 13, 1955
6 Sheets-Sheet 6
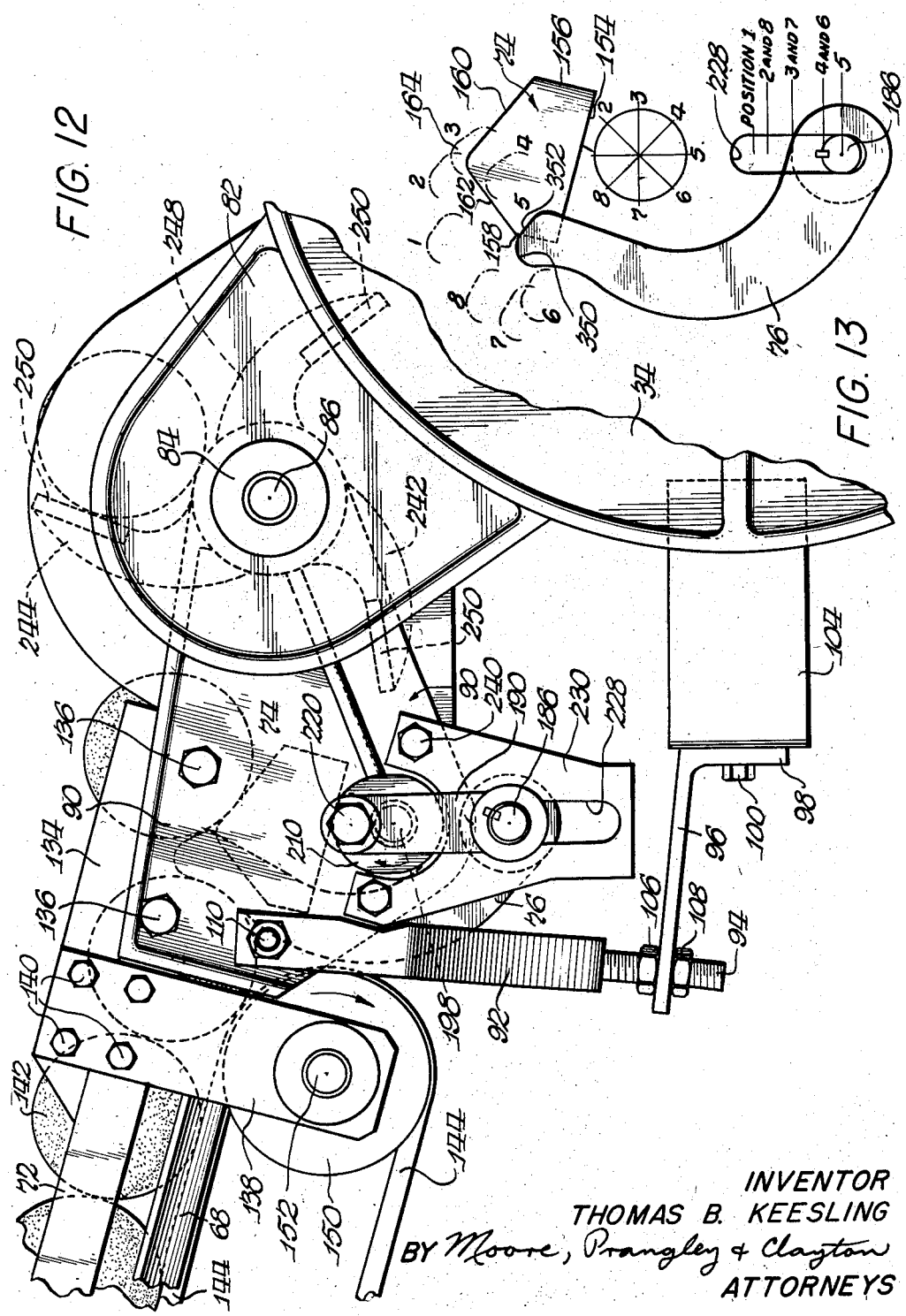
INVENTOR
THOMAS B. KEESLING
BY Moore, Prangley & Clayton
ATTORNEYS United States Patent Office 2,889,911
Patented June 9, 1959

2,889,911
FEED MECHANISM

Thomas B. Keesling, Los Gatos, Calif., assignor, by mesne assignments, to Food Machinery and Chemical Corporation, San Jose, Calif., a corporation of Delaware Application June 13, 1955, Serial No. 514,886

8 Claims. (Cl. 198—26)

This invention relates to feeding mechanisms and methods and particularly to apparatus and methods for feeding peaches and like fruit to processing apparatus therefor.

The feeding mechanism of the present invention is particularly adapted for feeding peaches and similar drupaceous fruit to automatic processing machinery. Accordingly, the invention will be specifically illustrated as applied to the feeding of peaches. The processing machinery with which the present feeding mechanism has particular utility is one in which the first operation is to orient the peach to align the stem indent and the suture plane in a predetermined direction. The orientation of the peach is carried out in a pair of spaced apart cup members which loosely confine the peach while it is rotated and oriented by an orienting wheel.

In order to assure proper operation of the above described type of orienting apparatus, it is necessary to insure that only one peach is present between the cup members. The presence of another peach in the same pair of cup members or adjacent the cup members interferes with proper operation of the orienting apparatus. Peaches which are not properly oriented are rejected from the machine prior to pitting. Any peach not properly oriented represents a decrease in capacity and efficiency of the entire machine with the consequent substantial economic loss.

Accordingly, it is an important object of the present invention to provide a feed mechanism of the type set forth which feeds peaches or the like one at a time to subsequent processing apparatus in a controlled manner.

Another object of the invention is to provide an improved feed mechanism employing a positive stop in cooperation with means to move peaches, one at a time, past the stop to insure that only one peach is fed by the feed mechanism for each predetermined time interval of operation.

Yet another object of the invention is to provide an improved feed mechanism in conjunction with an orienting apparatus, the feed mechanism increasing the efficiency of the orienting apparatus by depositing only one peach upon each orienting unit thereby insuring optimum efficiency of operation of each orienting unit.

Still another object of the invention is to provide a positive feed mechanism which feeds peaches and like fruit at a uniform rate and only one at a time regardless of the size of the peach.

A further object of the invention is to provide in a feed mechanism of the type set forth means to adjust the feed mechanism to varying sizes of fruit.

These and other objects and advantages of the invention will be better understood from the following description when taken into conjunction with the accompanying drawings. In the drawings wherein like reference numerals have been utilized to designate like parts throughout:

Figure 8 is a view in vertical section substantially as seen in the direction of the arrows along the line 8—8 of Figure 4;

Figures 9, 10 and 11 are fragmentary views showing the manner in which the feed finger of the present invention moves a peach across the positive stop;

Figure 12 is an enlarged side elevational view showing the mounting and the drive for the feed finger of the present invention; and Figure 13 is a diagrammatical view illustrating eight different positions of the tip of the feed finger as it moves a peach across the positive stop.

Figure 1:
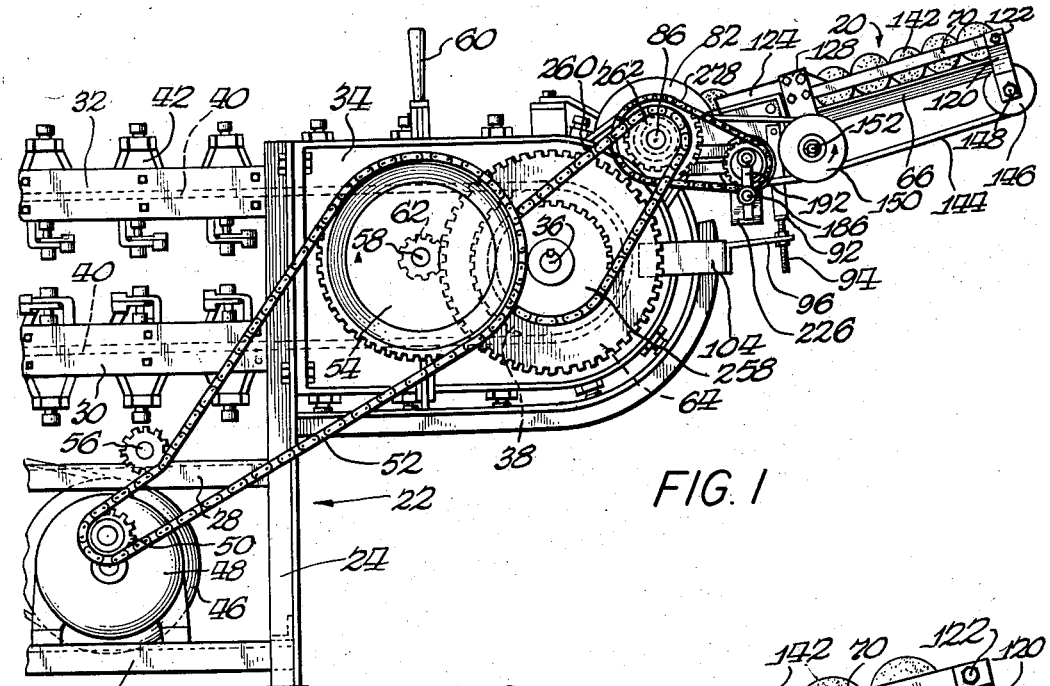
Figure 1 is a side elevational view of the feed end of a fruit processing machine having incorporated therein a feed mechanism made in accordance with and embodying the principles of the present invention.

Referring first to Figure 1 of the drawings the feed mechanism of the present invention generally designated by the numeral 20 is shown mounted on an automatic peach orienting, bisecting and pitting machine generally designated by the numeral 22. The machine 22 includes a vertical frame member 24 which is connected to other vertical frame members (not shown) by a plurality of horizontal frame members 26, 28, 30 and 32. The various frame members are suitably joined by bolts or by welding. Also attached to the frame member described above is a sub-frame 34 which supports certain of the operating parts including the feed mechanism 20.

Rotatably mounted on frame member 34 is a shaft 36 which supports a pair of sprocket wheels 38. Sprocket wheels 38 each in turn support one end of an endless chain 40. Mounted at spaced intervals on chains 40 are sets of peach receiving cups 42 which when juxtaposed form a receptacle for a piece of fruit while it is oriented and aligned by an orienting wheel 44 (see Figure 5 also).

The continuous chains 40 and the attached sets of cups 32 are continuously moved at a constant rate by a drive mechanism including a motor 46. Motor 46 is mounted on frame members 26 and the output thereof drives a gear reducing mechanism 48. The output of the gear reducing mechanism 48 appears on a sprocket wheel 50 which engages a drive chain 52. In addition to engaging sprocket 50, chain 52 also engages a larger sprocket wheel 54 and a small tightening sprocket wheel 56. Sprocket wheel 54 is connected to a main driving shaft 58 by means of a clutch mechanism operated by a handle 60. When the clutch is engaged, shaft 58 drives a small sprocket wheel 62 which meshes with a large sprocket wheel 64. Sprocket wheel 64 is fixedly mounted upon shaft 36 whereby to drive shaft 36, the attached sprocket wheel 38, the chains 40 and the fruit cups 42 mounted thereon.

The fruit orienting mechanism including the fruit cups 42 and the orienting wheel 44 work properly only if a single peach is positioned between the fruit cups 42. If a second peach is positioned in the fruit cups 42 or adjacent the fruit cups 42 in a position to contact the fruit within the fruit cups 42, proper orientation is not possible. This results from the fact that the fruit must be lightly balanced upon the orienting wheel 44 during orientation thereof and only slightly restrained by the sides of the fruit cups 42. The presence of a second peach interferes with the balancing of the peach to be oriented. As a result the peach within the cups is not oriented and must be ejected from the machine at an inspection stage and thereafter reintroduced to the machine through the feed mechanism 20. Therefore it is important that only one peach be fed to a pair of fruit cups 42 at any one time, and that the peach be fed to the cups 42 at a proper time whereby to insure that the peach is deposited within the receptacle formed by the fruit cups 42.

To this end the improved feed mechanism 20 has been provided. In general, feed mechanism 20 includes a pair of support rails 66—68 which form a feed trough and a pair of side rails 70—72. The lower rails 66—68 are inclined downwardly toward a positive stop 74 which serves to stop peaches rolling down the trough formed by rails 66—68. Lifting means including a pair of parallel feed fingers 76—78 is provided to lift the peaches, one at a time, over the positive stop 74 and deposit each peach in position to be picked up by one prong of the feed wheel or feed star generally designated by the numeral 80. Feed star 80 in turn deposits each peach in a waiting receptacle formed by cups 42 as may be best seen in Figure 5 of the drawings.

Referring to Figures 5, 6, 7, 8 and 12 particularly, the construction and mounting of the feed trough forming a part of the feed mechanism 20 will be described in detail. Fixedly secured to frame members 34 is a pair of brackets 82 which support a pair of bushing members 84. Rotatably journaled in bushing members 84 is a shaft 86 which supports the feed star 80. Pivotally mounted upon shaft 86 is a pair of castings 88 and 90 (see Figure 6) which extend outwardly therefrom to the left as viewed in Figures 4 and 12. The left hand ends of the castings 88 and 90 is viewed in these figures are adjustably supported by a U-shaped bracket 92. The center of bracket 92 has secured thereto a threaded bolt 94 which passes through an aperture in an arm 96. Arm 96 is provided with a flange 98 which is apertured to receive therethrough a threaded bolt 100 which receives a nut 102. Bolt 100 serves to connect flange 98 to another bracket 104 which is fixedly secured to bracket 34 described above. A pair of nuts 106 and 108 threadedly engage bolt 94 above and below arm 96 whereby to form an adjustable interconnection therebetween. One arm of bracket 92 is connected by means of a bolt 110 to casting 90 and the other arm of bracket 92 is similarly attached by a bolt to casting 88. By this described connection the position of the left hand end of castings 88 and 90 can be adjusted vertically with respect to the main machine frame including frame member 34.

Figure 4:
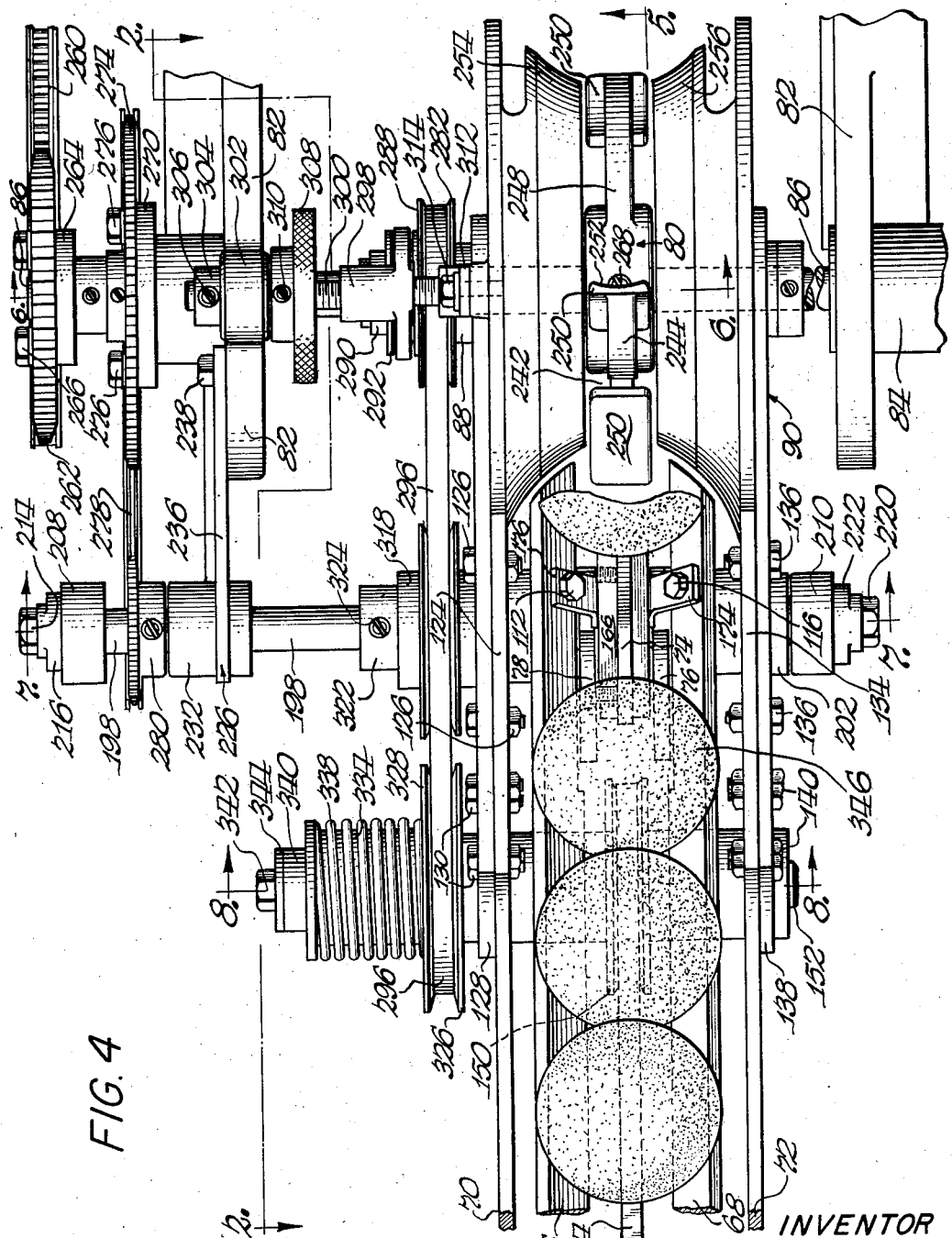
Figure 4 is an enlarged plan view with certain parts broken away of the feed mechanism shown in Figures 1 and 2 of the drawings.

The forward or right hand ends of the lower rails 66 and 68 are suitably secured to the castings 88 and 90, respectively. More specifically, a bolt 112 passes through rail 66 and threadedly engages in a projection 114 formed integral with casting 88 (see Figure 7). A bolt 116 similarly connects rail 68 to a projection 118 formed integral with casting 90. The outer ends of rails 66 and 68 are received and supported by a pair of brackets 120 which also are connected to support the side rails 70 and 72 as by bolts 122. The forward or right hand ends of side rails 70 and 72 as viewed in Figures 4 and 12 are supported upon the castings 88 and 90. More specifically casting 88 supports side rail 70 by means of bolt 126.

Side rail 70 supports a depending strap 128 which is secured thereto by the lower set of a pair of bolts 132. A guard plate 142 is in turn supported by strap 128 and is fastened thereto by a pair of bolts 130. Side rail 72 similarly supports a depending strap 138 which is attached thereto by a lower set of bolts 140. A guard plate 134 is attached to strap 138 by the upper set of bolts 140 by means of bolts 136.

From the above described construction it will be seen that the lower rails 66 and 68 provide an open bottom V-shaped trough along which peaches such as the peaches 142 can roll by gravity. The side rails 70 and 72 restrain the peaches 142 from unwanted side motion and retain them upon the lower rails 66 and 68.

Figure 2:
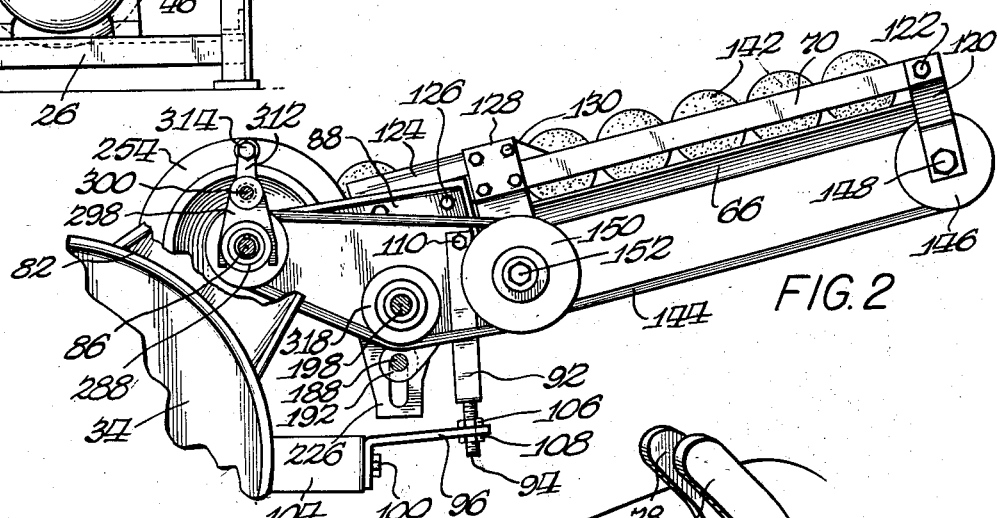
Figure 2 is an enlarged view in vertical section with certain parts broken away of the feed mechanism shown in Figure 1, substantially as seen in the direction of the arrows along the line 2—2 of Figure 4.

To insure that the peaches 142 progress down the feed trough one at a time and without bunching or crowding, a V-belt 144 is provided to contact the lower surfaces of the peaches 142 through the space between the lower rails 66 and 68. The outer end of belt 144 is supported by a sheave 146 (see Figures 1 and 2). Sheave 146 is rotatably mounted upon a shaft received in an elongated aperture in the brackets 120. A bolt 148 adjusts the position of the shaft with respect to the brackets 120. The other end of the V-belt 144 is supported by a second sheave 150 which is rotatably mounted upon a shaft 152 channeled in the straps 128 and 138. A fixed connection is made between sheave 150 and shaft 152 whereby sheave 150 is rotated and driven by shaft 152. The drive mechanism for shaft 152 will be described more particularly hereinafter.

Figure 3:
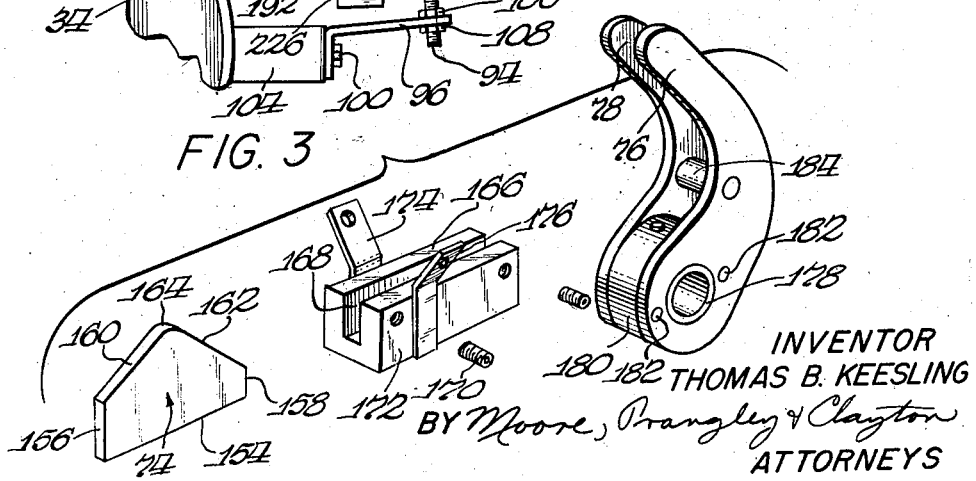
Figure 3 is an enlarged exploded view of the positive stop and the feed finger for moving peaches past the positive stop forming a part of the present feed mechanism.
Figure 5:
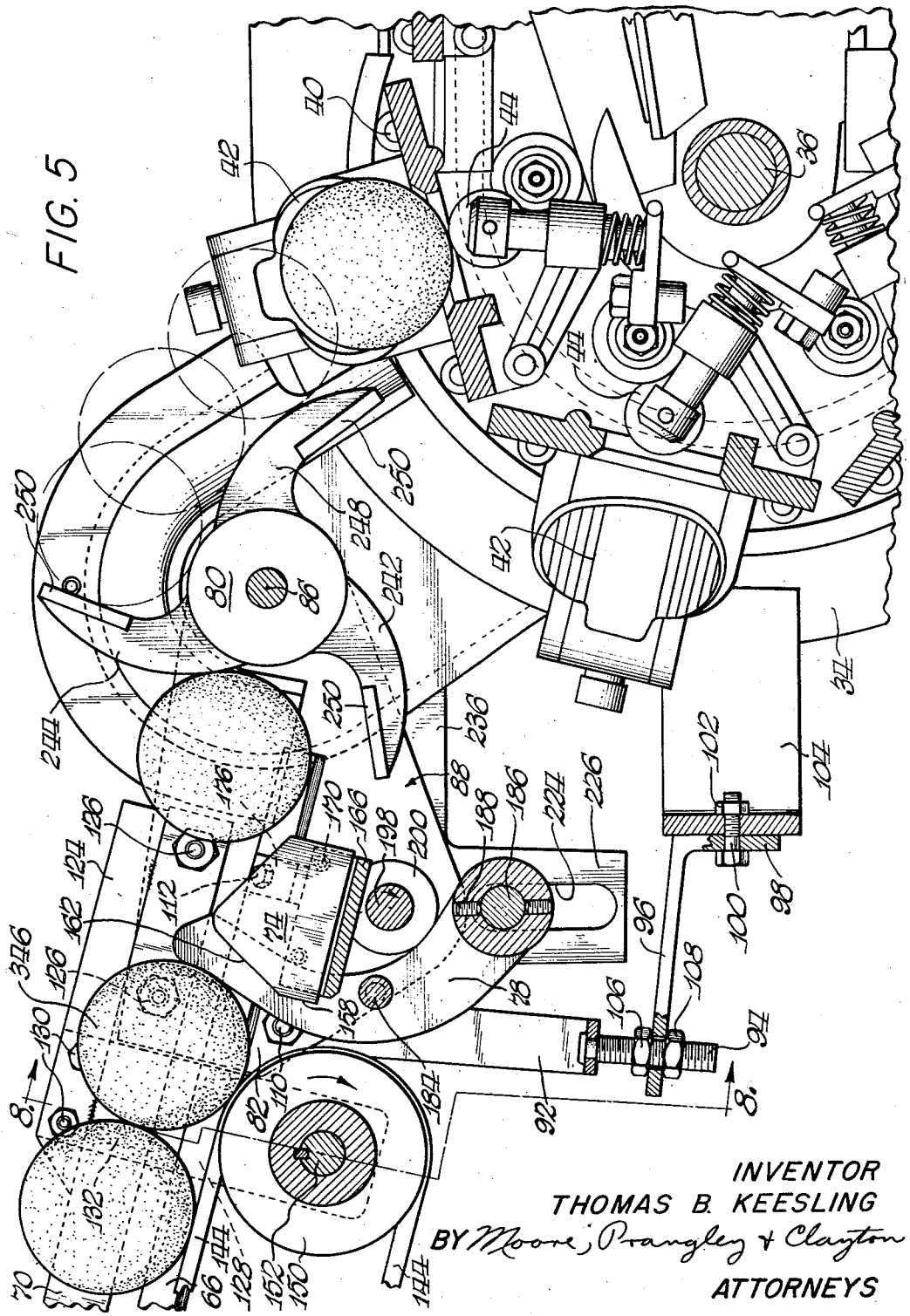
Figure 5 is a view in vertical section, substantially as seen in the direction of the arrows along the line 5—5 of Figure 4.

As the peaches 142 pass downwardly along the trough formed by lower rails 66 and 68 under the gentle urging of V-belt 144, they come to rest against the positive stop 74. By referring to Figures 3, 4, 5 and 7 the construction and mounting of stop 74 will be described in detail. Referring first to Figure 3, it will be seen that the stop 74 is formed as a flat plate having a lower side 154 from which extend upwardly a pair of vertical sides 156 and 158. Joining sides 156 and 158 is a pair of inclined sides 160 and 162 which intersect at an obtuse angle. The intersection as at 154 is rounded to prevent injury to peaches passing thereover. As is best seen in Figure 5 the sides 156 and 158 and the sides 160 and 162 are not symmetrical. Sides 158 and 162 are shorter than the corresponding sides 156 and 160. The shorter side 160 is positioned toward the feed trough and toward the advancing peaches.

Stop 74 is mounted within a U-shaped bracket 166. The length of bracket 166 is slightly less than the length of side 154 of stop 74 and there is provided a slot 168 within bracket 166 which is slightly wider than stop 74 whereby to receive stop 74. Stop 74 is retained in an adjusted position within bracket 166 by a pair of set screws 170 which engage threaded apertures 172 in the walls of bracket 166.

Welded to the sides of bracket 166 are a pair of flanges 174 and 176 having apertures therein to receive the bolts 112 and 116. Bolts 112 and 116 serve to support bracket 166 and the attached positive stop 74 on the castings 88 and 90, respectively (see Figures 4 and 7).

In normal operation the peaches passing down upon the lower rails 66 and 68 are firmly and positively stopped by stop 74 and cannot pass stop 74 without additional assistance. The feed fingers 76 and 78 are provided to lift a single peach over and past stop 74 so that a single peach is presented to the star wheel 80 at any one time. The shape and construction of the feed fingers 76 and 78 are best seen from Figure 3 of the drawings. The lower ends of the feed fingers are apertured to receive a bushing 178 and are spaced apart from each other by a spacing member 180. A pair of rivets 182 hold the two feed fingers 76 and 78 assembled about the spacer 180 and the bushing 178. A second spacer 184 is provided at a point intermediate the ends of the feed fingers 76 and 78.

The feed fingers 76 and 78 are fixedly mounted upon a shaft 186 by means of a pair of set screws 188 positioned in threaded apertures in the spacer 180. Shaft 186 is in turn supported at one end by a link 190 and at the other end by a second link 192 (see Figures 7 and 8). A pair of keys 194 and 196 fixedly connect shaft 186 to the links 190 and 192, respectively at the lower ends thereof. The links 190 and 192 are supported and driven from a drive shaft 198 which is journaled in a pair of bosses 200 and 202 formed integral with castings 88 and 90, respectively. Each of the bosses 200 and 202 is suitably aperture and is provided with a bushing 204 and 206, respectively, which receive and support the shaft 198. Connection between shaft 198 and shaft 186 is made by a pair of cranks 208 and 210. More specifically, crank 208 is keyed to shaft 198 by key 212 and threadedly receives a bolt 214 which passes through a bushing 216 provided in the upper and of link 192. The other end of shaft 198 is fixed to crank 210 by a key 218 and also threadedly receives a bolt 220 passing through a bushing 222 in the upper end of link 190. The above described construction serves to support shaft 186 upon shaft 198 but links 190 and 192 are freely swingable about bolts 214 and 220. As a result the upper ends of links 190 and 192 are moved upwardly and downwardly by cranks 208 and 210 when shaft 190 is rotated.

In order to restrain shaft 186 to move in a vertical direction when driven by shaft 198, shaft 186 passes through an elongated slot 224 in the vertical arm of a bracket 226 and a second slot 228 in another bracket 230. Bracket 226 is generally L-shaped and at the intersection of the arms thereof is provided with a boss 232 which is apertured and carries a bearing 234 which rotatably receives and supports shaft 198. The other arm 236 of bracket 226 extends forwardly or to the right as viewed in Figure 4 and is attached as a bolt 238 to the bracket 82. The bracket 230 at the other end of shaft 186 is suitably secured as by a pair of bolts 240 to the casting 90. By this described driving arrangement shaft 186 is moved vertically when shaft 198 is rotated because shaft 186 is restrained by slots 224 and 228. The vertical motion is imparted to shaft 186 by the fact that the point of attachment of links 190 and 192 to the cranks 210 and 208 is eccentric with respect to the axis of drive shaft 198. Because of the eccentric attachment of links 190 and 192, shaft 186 is rocked about its axis while partaking of its vertical reciprocating motion. Since the feed fingers 76 and 78 are fixedly secured to shaft 186 they also partake of this combined motion whereby to move a single peach across the positive stop 74 as will be described in greater detail later.

After the feed fingers 76—78 move a peach across the positive stop 74, the peach comes in contact with the star wheel 80 and is picked up by one of the arms thereof. Star wheel 80 as illustrated is provided with three arms 242, 244 and 248 which are equally spaced about the supporting shaft 86. Each of the arms includes a relatively small feed surface 250 which is slightly concave in shape as is shown at 252 in Figure 4. The concave surface 252 centers the peach in a transverse direction so that the peach will be delivered to the center of the receptacle formed by fruit cups 42. In order further to aid in delivering the fruit to the center of the receptacle formed by cups 42, two concave and arcuate guideways 254 and 256 are provided and are fixedly secured to the brackets 88 and 90.

In order to insure proper operation of the above described feed mechanism, the movement of the various operating parts of the entire machine must be properly synchronized. More specifically, the movement of the conveyor chains 40 carrying the fruit cups 42 must be synchronized with the operation of the star wheel 80 which in turn must be synchronized with the movement of the feed fingers 60 and 78 which in turn must be synchronized with the operation of the V-belt 144 which operates between rails 66 and 68. To this end all of the above described parts are driven from a common source of power, namely, motor 46.

Figure 6:
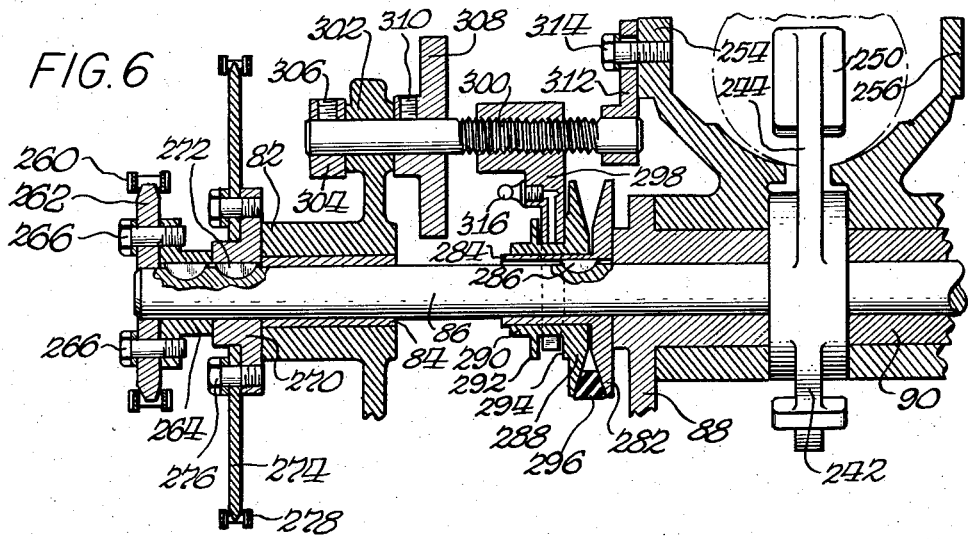
Figure 6 is a partial view in vertical section through the drive mechanism of the present invention substantially as seen in the direction of the arrows along the line 6—6 of Figure 4.

As has been described above the conveyor chains 40 are suitably driven from motor 46 by means of shaft 36. Also mounted upon shaft 36 is a sprocket wheel 258 which drives a chain 260. Chain 260 in turn drives a sprocket wheel 262 which is positioned on one end of shaft 86 as is best illustrated in Figures 4 and 6 of the drawings. Sprocket wheel 262 is adjustable with respect to shaft 286. More specifically, a collar 264 is fixedly mounted upon shaft 86 and sprocket wheel 268 is adjustably connected to collar 264 by a pair of bolts 266. By the above described connections sprocket wheel 262 and shaft 86 are driven at a predetermined rate, the rate being synchronized with the movement of the conveyor chains 40.

Rotation of shaft 86 drives the star wheel 80 since a set screw 268 fixes star wheel 80 upon shaft 86. The drive for rotating shaft 198 is also derived from shaft 86. Referring particularly to Figure 6 it will be seen that a hub 270 is keyed to shaft 86 by a key member 272. Adjustably mounted upon hub 270 is a sprocket wheel 274 which is connected to hub 270 by a pair of bolts 276. A chain 278 engages sprocket wheel 274 and drives another sprocket wheel 280 keyed to shaft 198 (see Figure 7). By this connection shaft 198 is rotated in synchronism with star wheel 80 and the other moving parts of the machine. Shaft 198 in turn drives shaft 168 whereby to move the feed fingers 76 and 78 in synchronism with the other parts of the machine.

The motive power for driving V-belt 144 is also derived from shaft 86. Referring first to Figure 6 it will be seen that a first half sheave 282 is provided having a hub 284 suitably keyed to shaft 86 by a key member 286. Cooperating with and rotatably mounted upon hub 284 is a second and movable half sheave 288 having a hub 290 provided with an outwardly and radially directed flange 292 provided a groove 294. Half sheaves 282 and 288 in combination form a sheave to receive and support a V-belt 296.

The effective pitch diameter of the sheave comprising half sheaves 282 and 288 can be varied by moving half sheave 288 toward and away from half sheave 282. To this end an adjusting mechanism has been provided including a fork member 298 which is threadedly received upon the threaded portion of a shaft 300.

Fork member 298 is bifurcated so that the legs thereof are disposed within groove 294. Accordingly, the position of half sheave 288 can be adjusted by moving fork member 298. One end of shaft 300 is journaled in a projection 302 formed on one of brackets 82. Positioned on the left hand of shaft 300 as viewed in Figure 6 is a collar 304 which is fixedly attached thereto by means of a set screw 306. A hand wheel 308 also receives shaft 300 through an aperture therein and is affixed to shaft 300 by a set screw 310 The right hand end of shaft 300 is rotatably received by a bracket 312 which is fastened to guideway 254 by a bolt 314. By turning hand wheel 308 the position of fork member 298 and the associated half sheave 288 with respect to half sheave 288 can be adjusted. A lubrication fitting 316 is provided on fork member 298 to lubricate the point of contact between fork member 298 and the half sheave 288.

Figure 7:
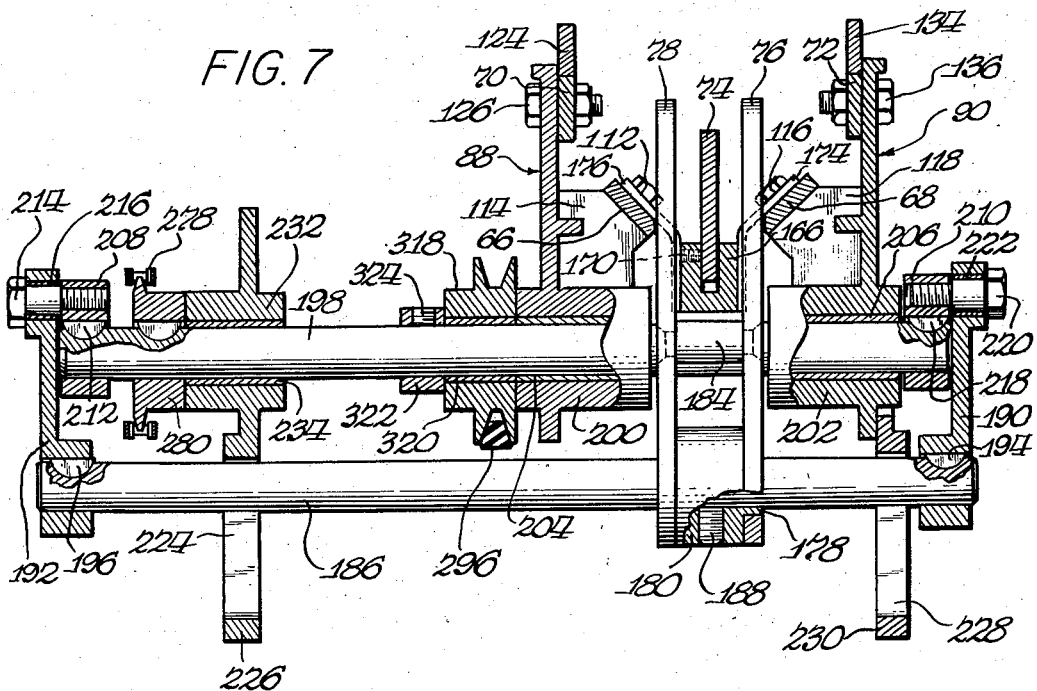
Figure 7 is a partial view in vertical section through the drive for the feed finger of the present invention substantially as seen in the direction of the arrows along the line 7—7 of Figure 4.

Referring now to Figure 7 it will be seen that the V-belt 296 also passes under an idler pulley 318 which is rotatably mounted upon shaft 198 by means of a bearing bushing 320. A collar 322 affixed to shaft 198 by a set screw 324 maintains pulley 318 in proper operating position besides the casting 88.

V-belt 296 also passes around a third pulley including a fixed half sheave 326 and a movable half sheave 328. Half sheave 326 includes a hub 330 which is fixedly connected to shaft 152 by a key member 332 (see Figure 8). Half sheave 328 has a hub portion 334 having an aperture therein to receive hub 330 of sheave 326. A key 336 interconnects half sheaves 324 and 328 to prevent relative rotation therebetween yet permitting axial sliding relative movement therebetween. A spring 338 is provided which continually urges half sheave 328 toward half sheave 326. The left hand end of spring 338 is held in position by a collar 340 mounted upon shaft 152 and held thereon by a bolt 342 and a washer 344.

The distance between half sheaves 326 and 328 is determined by the pressure exerted by the V-belt 296 against the action of spring 338. The greater the distance between the half sheaves 326 and 328, the smaller is the effective pitch diameter and vice versa. Accordingly, if the hand wheel 308 is turned to increase the effective pitch diameter of half sheaves 282 and 288, V-belt 296 is automatically tightened and accordingly, the pitch diameter of the half sheaves 326 and 328 will be decreased by moving the sheave 328 against the action of the spring 338. In this manner the speed of travel of the V-belt 144 can be accurately adjusted with respect to the rate of operation of the feed fingers 76 and 78, the star wheel 80 and the conveyor chains 40.

Referring now particularly to Figures 9 through 13 of the drawings, the operation of the positive stop 74 and of feed fingers 76 and 78 will be described in detail. As the peaches roll down the trough formed by rails 66 and 68 they are formed into a single row by the action of the side rails 70 and 72 and by the action of the V-belt 144. At the end of the rails 66 and 68 the peach comes against side 162 of the positive stop 74. If nothing further is done, the peach will remain in this position with one point resting upon side 162 of the stop 74 and another point resting upon the V-belt 144.

In order to move the peach resting against the positive stop 74 across the stop, the peach which is designated by the numeral 346, must be lifted and pushed thereover by the feed fingers 76 and 78. As peach 346 strikes stop 74 the feed fingers are in the position illustrated in Figures 9 and 13 of the drawings. More specifically, the crank 210 upon shaft 198 is positioned so that the eccentric connection with link 190 is at the lowermost point whereby to position shaft 186 in the lowermost point of slot 228. Link 190 is positioned vertically and as a result the tip 348 of finger 76 is inclined slightly forwardly with the rounded end 350 thereof lying beneath the peach 346.

Subsequent rotation of shaft 198 and crank 210 in a clockwise direction as viewed in Figures 9 through 13 moves shaft 186 upwardly within slot 228 in a vertical direction and simultaneously rotates feed finger 76 in a counterclockwise direction with shaft 186. The successive positions of the tip 350 of finger 76 are illustrated in Figure 13. There it will be noted that in moving from position 5 to position 6, the rounded tip 350 is slightly lowered as well as being moved to the left. The circle divided into eight numbered sections represents eight different positions of the crank 210 and corresponding points around the circle are correspondingly numbered in the dot-dashed representation of the positions of the tip 350 of finger 76. The position of the shaft 186 within slot 228 is also noted in Figure 13.

In going from position 6 to position 7, the rounded tip 350 moves farther to the left and upwardly to a position slightly above the starting position 5. Further rotation of the crank 210 places the parts in position 8 which is also illustrated in Figure 10 of the drawings. The forward part of tip 350 is formed slightly concave as at 352 and in position 8 the concave portion 350 has engaged peach 346 and has begun to lift peach 346 upwardly by sliding it along side 162 of stop 74. Since peach 346 is being engaged at spaced apart points by two feed fingers 76 and 78, it is maintained in a substantially aligned position.

Continued rotation of crank 210 moves the tip 350 of feed finger 76 to position 1 and then to position 2. In position 1 the peach is resting substantially upon the round point 164 of stop 74. Further movement of finger 76 to position 2 moves the peach 346 across point 164 and downwardly onto side 160. From this point, peach 346 will fall under the influence of gravity onto the waiting arm 242 of the star wheel 84.

Support member 250 on arm 242 will then carry peach 346 upwardly and deposit it in a receptacle formed by a pair of cups 42 on the conveyor chains 40 which will be in proper opened position to receive peach 346.

In order to achieve proper operation of the feed mechanism, it is essential that the various parts of the machine move in proper timed relationship. It is for this reason that the various adjustments in the drive mechanism have been provided. More specifically, the engagement between sprocket wheel 262 and shaft 86 can be adjusted as can be the relationship between sprocket 270 and shaft 86. The adjustment of the speed of operation of the V-belt 144 by turning hand wheel 308 also insures that the peaches are presented one at a time in single file to the positive stop 74 and the feed fingers 76 and 78. The rate of travel of V-belt 144 is preferably adjusted for each different size peach being fed into the machine. It is for this reason that it is important to provide a simple and readily accessible means for adjusting the drive for V-belt 144.

By the above described feed mechanism peaches are fed one at a time over the positive stop 74 by operation of the feed fingers 76 and 78. The single peach is then picked up by one of the support surfaces 250 on the star wheel 80 and is deposited within a receptacle on the conveyor chains 40. By virtue of the described mechanism, only one peach is deposited in each receptacle on conveyor chains 40. Accordingly, optimum orienting efficiency is obtained at all times. It has been found that the use of the improved feed mechanism of the present invention can increase the overall capacity of the fruit processing machine by as much as 15 percent.

Although a preferred embodiment of the present invention has been shown for purposes of illustration, it is to be understood that various changes and modifications can be made therein without departing from the spirit and scope thereof. Accordingly, the invention is to be limited only as set forth in the following claims.

I claim:
1. Feed mechanism for feeding ovaloid fruit to processing machinery therefor comprising a substantially U-shaped trough means to feed ovaloid fruit in single file therealong, a positive stop extending into said trough means positively to stop movement of ovaloid fruit therealong, a pair of feed fingers mounted adjacent said positive stop on opposite sides thereof to engage at spaced apart points the ovaloid piece of fruit abutting against said stop, and drive means periodically to move said feed fingers into engagement with said ovaloid piece of fruit to lift said fruit upwardly over said positive stop to deliver it to the next stage of the fruit processing machinery.

2. Feed mechanism for feeding fruit to processing machinery therefor comprising an inclined feed trough, a positive stop positioned adjacent the lower end of said feed trough in position to engage and positively to stop fruit moving down said feed trough, feed finger means mounted adjacent said stop to engage the piece of fruit abutting against said stop, and drive means for said feed finger means, said drive means including a shaft upon which said finger means is fixedly mounted, guide means to guide said shaft in a rectilinear direction, a link fixedly attached to said shaft, and an eccentric crank driving said link whereby to move said shaft in a rectilinear direction while oscillating said shaft about its axis whereby to impart movement to said feed finger means to place it in engagement with said piece of fruit and lift said piece of fruit over said positive stop.

3. A feed mechanism for feeding ovaloid fruit to processing machinery therefor comprising an open bottom substantially U-shaped feed trough, a feed belt positioned adjacent the open bottom of said feed trough to engage ovaloid fruit supported by said feed trough, means to drive said feed belt in the direction of movement of fruit along said feed trough to arrange the fruit in single file therein, a positive stop adjacent the discharge end of said feed trough extending upwardly therein to engage and positively to stop ovaloid fruit moving therealong, feed finger means mounted upon a shaft adjacent said feed trough, drive means for said feed finger means to move said shaft and said feed finger means in a vertical direction and simultaneously to pivot said feed finger means about the axis of said shaft whereby to engage the piece of fruit abutting against said positive stop to lift said piece of fruit over said positive stop, and means to adjust the relative rate of operation of said feed belt drive means and said feed finger drive means in accordance with the size of fruit being fed.

4. A feed mechanism for feeding fruit to processing machinery therefor comprising an open bottom feed trough, a feed belt positioned adjacent the open bottom of said feed trough to engage fruit supported by said feed trough, means to drive said feed belt in the direction of movement of fruit along said feed trough to arrange the fruit in single file therein, a positive stop adjacent the discharge end of said feed trough extending upwardly therein to engage and positively to stop fruit moving therealong, a pair of feed fingers mounted adjacent said feed trough and on opposite sides of and adjacent said stop, a shaft positioned beneath said positive stop to which said feed fingers are fixedly attached, guide means to guide said shaft in a rectilinear and substantially vertical direction, a link fixedly attached to said shaft, and an eccentric crank to drive said link to reciprocate said shaft in a substantially vertical rectilinear direction while pivoting said shaft about its axis whereby to cause said feed fingers to engage the piece of fruit abutting said said positive stop to lift said piece of fruit upwardly and over said positive stop.

5. Feed mechanism for feeding ovaloid fruit to processing machinery therefor comprising a substantially U-shaped feed trough to feed fruit in single file therealong, a positive stop adjacent the discharge end of said feed trough to engage and positively to stop fruit moving therealong, a feed wheel mounted adjacent the discharge end of said trough, drive means for said feed wheel to rotate said wheel to move fruit from the discharge end of said feed trough to fruit receiving receptacles on the processing machinery, a pair of feed fingers positioned adjacent the discharge end of said feed trough, drive means for said feed fingers to move said feed fingers into engagement with the piece of fruit abutting against said positive stop to lift said piece of fruit over said stop to deliver it to said feed wheel, and means to adjust said feed belt drive means with respect to said feed finger drive means and said feed wheel drive means and to adjust said feed finger drive means with respect to said feed wheel drive means.

6. Feed mechanism for feeding ovaloid fruit to processing machinery therefor comprising trough means to feed ovaloid fruit in single file therealong, a positive stop extending into said trough means positively to stop movement of fruit therealong, feed finger means mounted adjacent said positive stop to engage the piece of ovaloid fruit abutting against said stop, and drive means periodically to move said feed finger means bodily upwardly to lift the adjacent piece of fruit and to pivot said feed finger means toward said stop to move the piece of fruit upwardly over said stop to deliver it to the next stage of the fruit processing machinery.

7. Feed mechanism for feeding ovaloid fruit to processing machinery therefor comprising trough means to feed fruit in single file therealong, a positive stop extending into said trough means positively to stop movement of fruit therealong, a pair of feed fingers mounted upon a shaft adjacent said positive stop to engage the piece of ovaloid fruit abutting against said stop, and drive means periodically to move said shaft and said feed fingers in a vertical direction and simultaneously to pivot said feed fingers about the axis of said shaft whereby to engage the piece of fruit abutting against said positive stop to lift said piece of fruit over said positive stop to deliver it to the next stage of the fruit processing machinery.

8. Feed mechanism for feeding ovaloid fruit to processing machinery therefor comprising trough means to feed ovaloid fruit in single file therealong, a positive stop extending into said trough means positively to stop movement of ovaloid fruit therealong, a pair of feed fingers mounted adjacent said positive stop to engage the piece of fruit abutting against said stop, and drive means periodically to move the tip of said fingers from a position in front of said piece of fruit downwardly beneath then rearwardly to a point behind the lowermost portion of said fruit and then upwardly and forwardly to lift said fruit upwardly and push it forwardly over said stop to deliver it to the next stage of the fruit processing machinery.

References Cited in the file of this patent

UNITED STATES PATENTS

| | | |
|---|---|---|
| 478,731 | Bancroft | July 12, 1892 |
| 708,687 | Winans | Sept. 9, 1902 |

FOREIGN PATENTS

| | | |
|---|---|---|
| 667,892 | Great Britain | Mar. 12, 1952 |

UNITED STATES PATENT OFFICE

CERTIFICATE OF CORRECTION

Patent No. 2,889,911

June 9, 1959

Thomas B. Keesling

It is hereby certified that error appears in the above numbered patent requiring correction and that the said Letters Patent should read as corrected below.

Column 3, line 43, for "is viewed" read -- as viewed --; column 5, line 16, for "and of" read -- end of --; column 6, line 39, for "provided" read -- providing --; line 71, for "besides" read -- beside --; column 9, line 40, for "said said" read -- against said --.

Signed and sealed this 13th day of October 1959.

(SEAL)
Attest:
KARL H. AXLINE

Attesting Officer

ROBERT C. WATSON
Commissioner of Patents